Sept. 19, 1961 A. BAUMANN 3,000,518
CONVEYOR DISTRIBUTING SYSTEM WITH STATION SELECTOR
Filed Jan. 7, 1960 5 Sheets-Sheet 1

INVENTOR:
Albert Baumann
BY
Agent

INVENTOR:
Albert Baumann
BY
Agent

United States Patent Office 3,000,518
Patented Sept. 19, 1961

3,000,518
CONVEYOR DISTRIBUTING SYSTEM WITH STATION SELECTOR
Albert Baumann, Bielefeld, Germany, assignor to Durkoppwerke Aktiengesellschaft, Bielefeld, Germany, a corporation of Germany
Filed Jan. 7, 1960, Ser. No. 1,085
Claims priority, application Germany Jan. 9, 1959
15 Claims. (Cl. 214—11)

This invention relates to conveyors having a plurality of individual load carriers sequentially movable along an elongated path and adapted automatically to discharge the load of each carrier at a preselected one of a plurality of receiving stations.

Conveyors of this type are employed in manufacturing plants to transport goods in process between working stations, and generally to distribute articles in a predetermined pattern. A conveyor system suitable for these purposes has been disclosed in co-pending U.S. patent application Ser. No. 767,463 filed October 15, 1958 by Helmut Bünten and myself.

The earlier application discloses a plurality of linked carriages movable along an elongated track, each carriage having a load-supporting platform composed of two substantially comb-shaped grids with the elements corresponding to the teeth of a comb partly interleaved in a common plane of load support. The grids are individually pivotable out of the plane in opposite directions about parallel longitudinal axes so as selectively to discharge a load on either side of the track, the term "longitudinal" being understood here and throughout this specification and the appended claims to denote the direction of movement of the load carriers along their elongated path. Other directional terms are to be construed accordingly.

While a conveyor of the aforedescribed type is useful in many applications, the cantilevered tooth-like grid elements were found to lack stability and adequate strength to support heavy loads unless they were very massively built. To permit one grid to support the entire load during the discharging operation of the carriage, as is inherently necessary, the grid must be designed for the maximum carrying capacity of the platform. The combined weight and bulk of both grids thus is twice that required for carrying a maximum load in the normal, substantially horizontal position of the platform.

It is, therefore, a primary object of this invention to provide a conveyor adapted to discharge goods at preselected points along its path on opposite sides of the track, the conveyor structure being of small weight and bulk relatively to its load-carrying capacity.

Another object of this invention is the provision of a conveyor which is operable with load-supporting carrier platforms which are substantially continuous and seamless.

With these and other objects in view, the invention provides a load-carrier arrangement in which each carrier is equipped with two pivot members which respectively define two preferably horizontal, generally parallel axes of rotation. A load-supporting member is releasably mounted on the pivot members and has a load-supporting face, such as a flat platform surface, which is normally horizontal. The arrangement of the invention further includes means for swinging the load-supporting member on either one of the pivot members about the respective axis and for simultaneously releasing the load-supporting member from the other pivot member. It is thus possible selectively to tilt the supporting face about one or the other of the pivot axes from its normal position into one of two inclined off-normal positions in which the load on the supporting face is laterally discharged from the conveyor in one of two opposite directions.

Other features of the invention and additional objects thereof will be readily apparent as the invention becomes better understood by reference to the following detailed description when considered in connection with the accompanying drawing, wherein:

FIG. 3 illustrates in more detail a portion of the apparatus of FIG. 2 with the conveyor carriage returned to its normal position;

Figure 1:
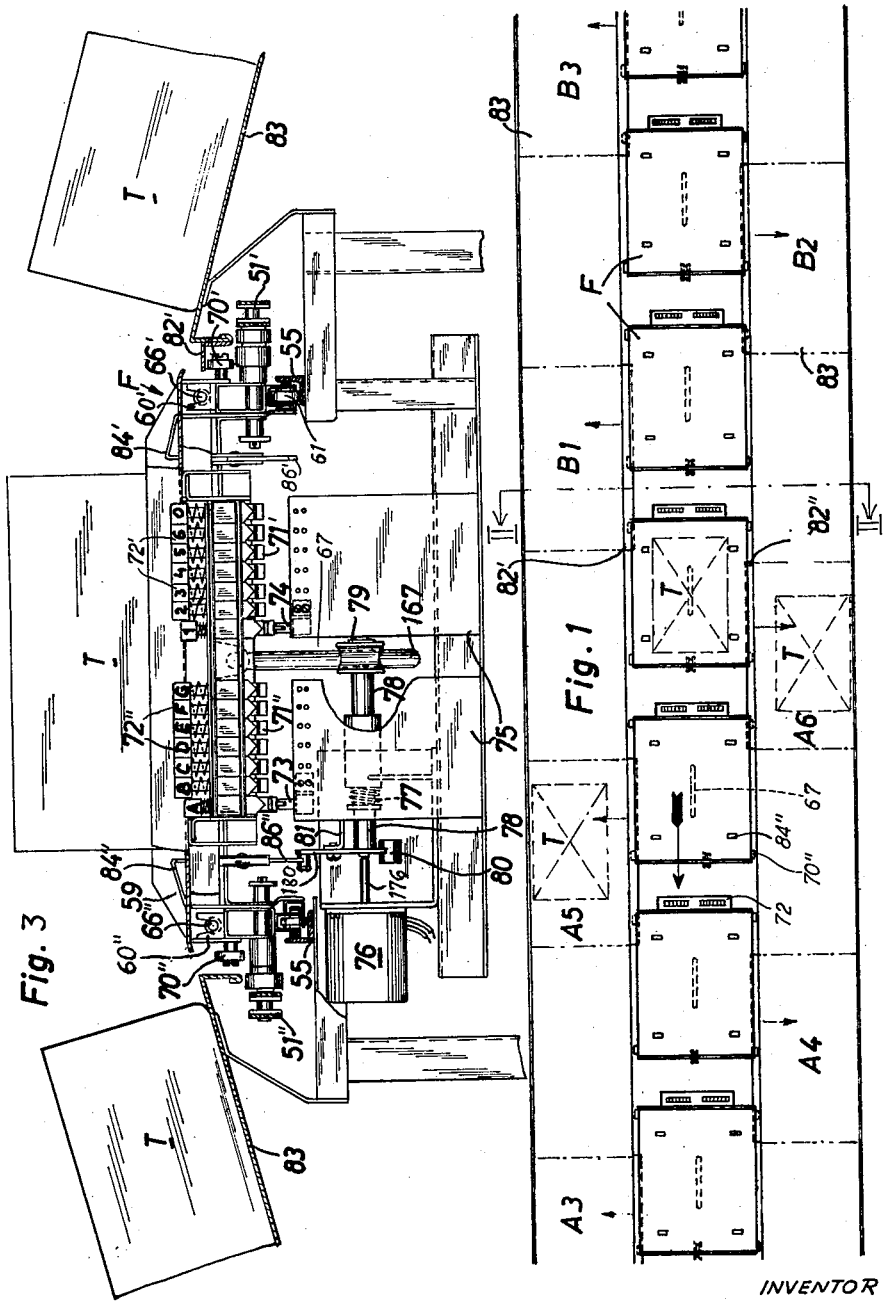
FIG. 1 is a somewhat schematic top view of the central portion of a conveyor embodying the invention.

In FIG. 1 there is seen the central portion of a conveyor in top view. A string of carriages F is movable along a straight horizontal path in the direction of the heavy arrow. Each carriage may support a load T, such as a cardboard box containing raw or partly finished goods, between four detents 84. The carriage platforms 59 (FIGS. 2, 3 and 5) are adapted to pivot about two longitudinal axes, formed by horizontal rods 66′, 66″ extending along the lateral edges of the platform, to discharge a container T at one of a plurality of work stations alternately arranged at opposite sides of the conveyor path, each station having a receiving surface 83 and being designated by an individual code number consisting of a letter and a numeral; stations A3 to A6 and B1 to B3 are shown in the drawing.

Pivotal movement of the carriage platform 59 is effected by a depending bail 67 adapted to be cammed upwardly by a roller 79 so as to cause the platform to tilt as will be described more fully hereinafter. To prevent tilting of the platform in a direction away from an adjacent work station, each carriage is provided with two pairs of guide rollers 70′, 70″ positioned along the lateral edges of the platform for travel under respective angle-iron rails 82′, 82″; one such rail is located alongside each station to oppose reverse pivoting of the platform 59 of any carriage, as its bail 67 is lifted by a roller 79, even if the center of gravity of the platform should be initially on the side of the bail remote from the receiving surface 83 of the station.

Each carriage is equipped with two groups of code elements in the form of pushbuttons 72 each identified with a code letter or a code numeral of a discharge station. The discharge point of a platform is selected by pressing the corresponding pushbutton 72.

Figure 2:
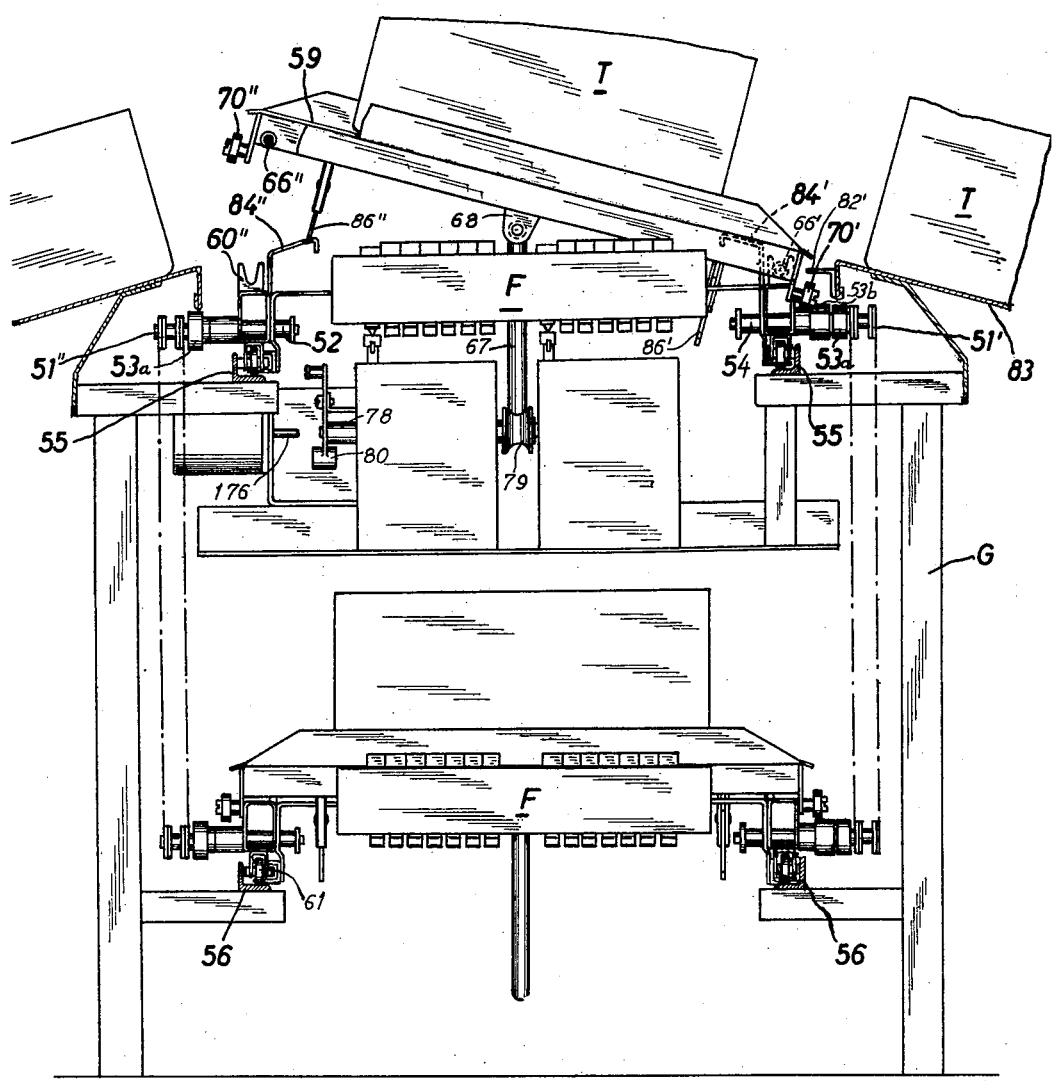
FIG. 2 shows a transverse sectional elevation of the conveyor taken on line II—II of FIG. 1, a conveyor carriage being illustrated in the discharging position.

As seen in FIG. 2, the carriages F are moved along the conveyor path by two endless sprocket chains 51′, 51″. The chains have straight horizontal upper and lower runs connected at their terminals by semi-circular portions trained over motor-driven sprocket wheels (not shown) in the manner illustrated in FIG. 5 of my prior Patent No. 2,901,082.

Figure 5:
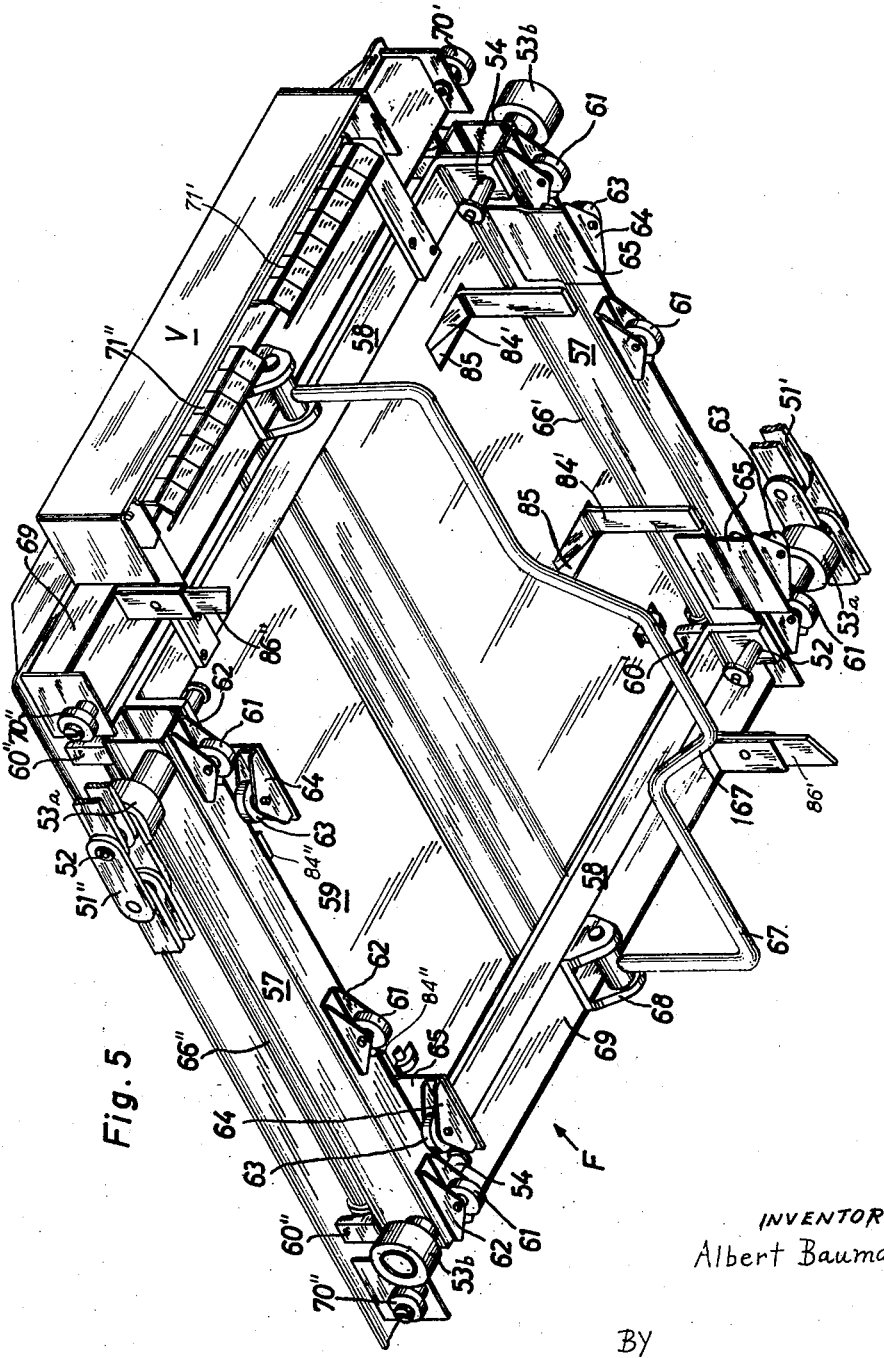
FIG. 5 is a bottom view of one of the carriages of FIGS. 1–4 in perspective representation on a somewhat enlarged scale.

FIGS. 2 and 5 show that the carriages F are secured between the two chains 51′, 51″ by means of dowels 52 and 54 on which idler rollers 53a and 53b are journaled. The dowels 52, supporting the rollers 53a, are mounted on diagonally opposite corners of each carriage and serve as connecting bolts between two links of the respective chain; the rollers 53b are mounted on the dowels 54 which are not linked to the chains. The two roller pairs 53a, 53b are engageable, at the terminal portion of each run, by movable or stationary guides (not shown), e.g. in the form of curved supporting strips or of additional sprocket wheels mounted on the shafts of the axially offset chain-driving wheels, which help maintain the carriages horizontal in their transition from one level to the other.

The supporting frame G (FIG. 2) of the conveyor is seen to be equipped with rails 55 and 56 respectively forming the upper and lower conveyor tracks on which the runners 61 of the carriages F travel. The load-supporting platform 59 of each carriage rests on two pairs of saddles 60', 60" or U-shaped cross section which receive the pivotal rods 66', 66" of the platform in the normal horizontal position thereof.

The details of the carriage structure are best seen in FIG. 5, which shows the platform-supporting saddles 60', 60" mounted on a rectangular carriage frame composed of two longitudinal channel members 57 by means of bearing brackets 62. The frame also carries guide rollers 63 which are journaled in brackets 64 whose mounting plates 65 extend downwardly from the channel members 57. Each pair of saddles 60', 60" are arranged on opposite ends of a respective channel member 57.

The bail 67 is pivoted to the underside of the platform 59 by means of two bearing brackets 68 fastened in the longitudinal median plane of the platform to two transverse reinforcing bars 69. The center of the bail is outwardly offset so as to form a trapezoidal camming portion 167. With the bail 67 hingedly depending from the underside of the platform 59, the flanks of camming portion 167 normally extend in the longitudinal median plane of the platform but are free to swing laterally thereof so as to remain engaged with the lift roller 79 while permitting a tilting motion as shown in FIG. 2. The guide rollers 70' and 70" mentioned above are rotatably mounted on the lateral faces of the reinforcing bars 69.

Two groups of spring-loaded pushbuttons 72', 72" are mounted on the rearward bar member 58 within a housing V which is omitted in FIG. 3. Each pushbutton, when depressed, acts upon a finger 71', 71" to move it downward from its retracted position, illustrated in FIG. 5, into an operative position, shown in FIG. 3 for the code elements A and 1, in which it projects below the remaining fingers of its group. As seen from FIG. 3, the seven fingers 71" of one group are identified by the code letters A to G, whereas the fingers 71' of the other groups are identified by the code numerals 0 to 6. The selector system illustrated is capable of forty-nine permutations if only one pushbutton of each group is to be actuated at a time. Suitable lockout means known per se, e.g. as shown in co-pending applications Ser. Nos. 857,353 and 857,402 filed on December 4, 1959 jointly by Erwin Grube and myself, may be used to insure that a previously actuated pushbutton is restored, together with the associated selector finger, whenever another pushbutton of the same group is depressed. The condition shown in FIG. 5, in which all fourteen fingers 71', 71" are retracted, may be brought about by a special resetting knob acting upon the detent mechanism which holds the selector fingers 71', 71" in their displaced positions against the face of their respective restoring springs. It will be understood that the number of code elements in each group may be extended if it be desired to accommodate more than forty-nine stations.

The platform 59 is formed with four transverse slots 85 through which four detents 84', 84" pass. The detents are made of bent strip stock and are fastened to the inner faces of the channel members 57. Only two of the openings 85 are visible in FIG. 5, and only the end faces of the two detents 84" can be seen in this figure.

Figure 4:
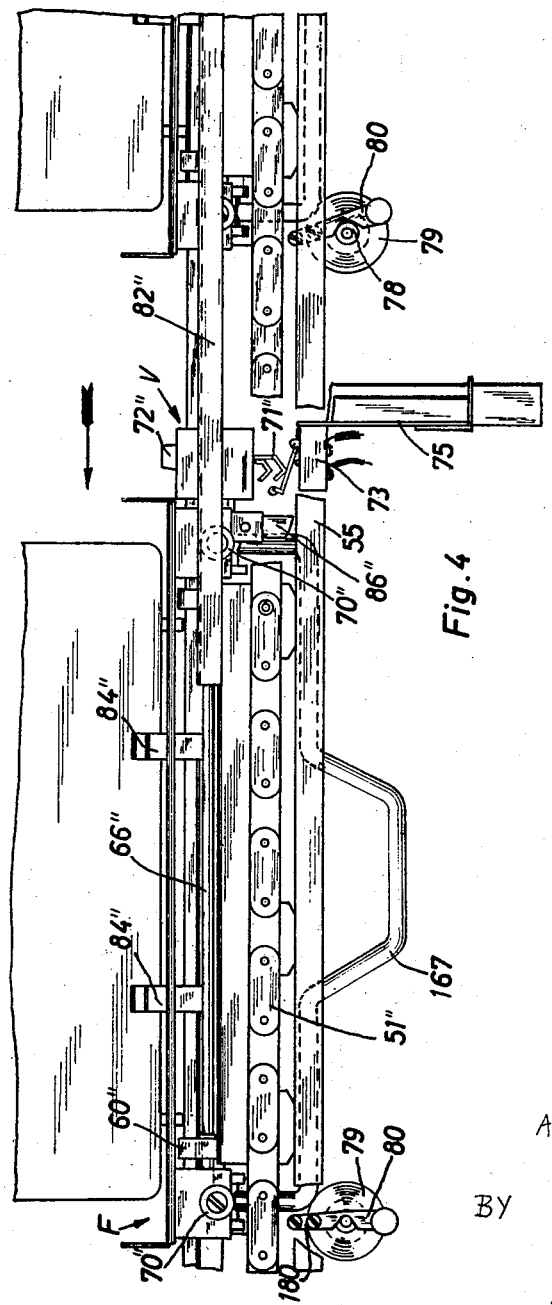
FIG. 4 shows a portion of the apparatus of FIG. 1 in side elevation with the supporting structure partly broken away.

The selector system and its co-operation with the mechanism for tilting the platform 59 at a selected discharge station is seen most readily from FIGS. 3 and 4. At each of the receiving stations of the conveyor, two normally open switches 73 and 74 are mounted on a longitudinally split base 75. The base 75 is preformed with as many sets of mounting holes as there are pushbuttons 72 on the keyboard, so that the position of the switches 73 and 74 may readily be altered if desired. The actuating arms of the switches are each alignged with one of the fingers 71" 71', respectively, so that the switch is momentarily closed as the corresponding finger travels over it during passage of a carriage.

The switches 73 and 74 are connected in series with each other, and with a solenoid 76, across a source of electric current not shown. Thus, the solenoid 76 is energized only when both switches 73 and 74 are simultaneously closed. The switches 73 and 74 of the discharge station shown in FIG. 3 are positioned for response to the code signal A1, and the keyboard of the carriage F approaching the station has been set for discharge at this station.

Simultaneous closing of switches 73 and 74 causes the armature 176 of the solenoid 76 to move toward the right, as viewed in FIG. 3, and into endwise abutment against a pin 78 which is axially slidable in a transverse direction on a stationary member of the support frame G. A helical spring 77 permanently urges the pin 78 toward the solenoid armature 176, that is, toward the left as viewed in FIG. 3.

The circumferentially grooved lift roller 79 is journaled on the free end of the pin 78 remote from the solenoid. In the terminal operative position of the solenoid armature 176, this roller is aligned for camming engagement with the forward flanks of the offset bail portion 167 of an approaching carriage F. The roller 79 is held in the aligned position by a weighted lever 80 whose lower, notched arm drops in behind the end of the pin 78 when it is moved by the armature 176 into the aligned position of the lift roller. The lever 80 is pivotally mounted on the support frame G by means of a bracket 81. A trip blade 86", normally aligned with the upper arm 180 of the weighted lever 80, is mounted on the rear platform-reinforcing bar 69 of each carriage F to release the lever from engagement with the pin 78 and to allow the lift roller 79 to return to its normal retracted position, out of line with the path of travel of the bail 67, under the urging of the spring 77; a companion blade 86', secured diagonally opposite blade 86" to the other reinforcing bar 69, enables the reversal of platform 59 on the carriage.

The system described above operates as follows:

The operator, upon placing a container T on any carriage F, depresses a selected combination of pushbuttons 72', 72" indicating the code designation of the receiving station for which the container is intended. When the carriage reaches that station, the selector mechanism causes the lift roller 79 to be placed in the path of the bail 67 as previously explained. Camming displacement of the portion 167 by the groove of the roller causes the bail to urge the center of the platform 59 upwardly. The roller 79 is so located that the sloping carriage platform 59 is laterally aligned and co-planar with the receiving surface 83 while the horizontal leg of camming portion 167 travels over the roller.

The platform 59 is thus raised as it approaches the receiving station, remains in its position of maximum angular displacement while stubstantially aligned with the receiving platform, and then gradually returns to its normal horizontal position.

If the combined center of gravity of the carriage platform 59 and the load T thereon lies beyond the longitudinal median plane of the carriage as seen from the receiving surface 83, the carriage platform 59 will initially tend to tilt in a direction away from the receiving platform 83 onto which the container T is to be discharged. Any tendency of a platform 59 to tilt in the wrong direction is, however, overcome by abutment of the guide rollers 70' or 70" against the corresponding angle-iron rail 82' or 82", more particularly rollers 70' and rail 82' in the position illustrated in FIG. 2. With any lateral displacement of the load in either direction prevented at this time by the detents 84' and 84', the load will be free to move only after the platform has been swung through a certain minimum angle in the one direction in which it is free to tilt, i.e. by rotating about the axis of right-hand rod 66' as shown in FIG. 2. As the load T starts to slide downwardly, the center of gravity shifts toward the receiving surface 83 so that the pivotal rod 66', if it has moved slightly upward in its saddles 60' during the initial movement of the platform, is now firmly pressed into contact with these saddles.

Figure 6:
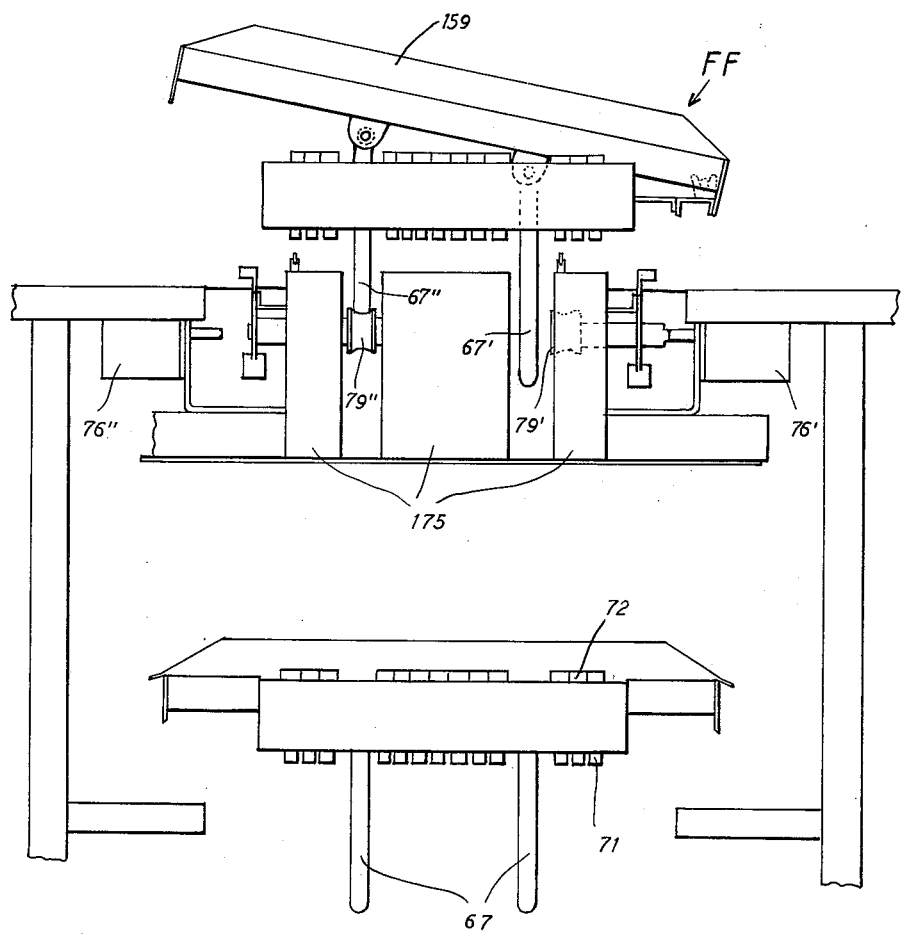
FIG. 6 illustrates a modification of the apparatus of FIGS. 1–5 in a view corresponding to that of FIG. 2.

Any tendency of the platform to tilt in the wrong direction in the initial stage of the discharge operation may also be overcome without the use of retaining rails 82', 82" by modifying the carrier arrangement of the invention in the manner illustrated in FIG. 6. This figure shows a conveyor similar to that illustrated in FIG. 2, but having carriages F each equipped with two dependent bails 67', 67", structurally identical with the bail 67 of FIGS. 1–5, which are laterally offset from the median plane of the carriage in opposite directions. Tilting movement of the platform 159 is brought about by camming engagement of a respective lift roller 79', 79" with the bail 67' or 67" remote from the receiving surface at which a load is to be discharged so that under all practical conditions the combined center of gravity of the platform 159 and of the load will be located between the plane of the bail and the pivotal rod 66' or 66" adjacent the receiving surface.

It will be apparent that the modification illustrated in FIG. 6 involves minor adjustments in the disposition of the base 175 and various elements of the selector mechanism to provide the necessary clearance for the travel of the two bails 67', 67". The operation of the modified device is substantially the same as that of a conveyor according to the preceding embodiment, except that the odd-numbered stations A3, A5 etc. (FIG. 5) are equipped with solenoids 76" as shown on the left-hand side of FIG. 6, the even-numbered stations A4, A6 etc. being provided with solenoids 76' on the right, whereby either the roller 79" or the roller 79' is actuated if a carriage bearing the corresponding code designation passes any of these stations.

The conveyor of the invention may be loaded at any point along the path of the carriages on either the upper or the lower run. While only the upper run has been shown as equipped with discharging stations in the embodiment illustrated and described, the invention is not limited to any particular arrangement of discharging stations nor to any specific path of travel of the conveyor carriages. It is equally adaptable to distribution systems in which the individual load carriers are fastened to continuous elongated members, such as the driving chains 51' and 51" which effect their movement, and to systems in which the carriers move under the force of gravity along a track or the like without such driving means.

Reference may be made to my aforementioned U.S. Patent No. 2,901,082 for further details of a conveyor and distributing system of the general type discussed hereinabove. It may also be mentioned that selective actuation of solenoids 76 or 76', 76" may be effected from a control post longside the track, as likewise shown in that patent.

Evidently, many modifications and variations of the present invention are possible in the light of the above teachings. It is therefore to be understood that within the scope of the appended claims, the invention may be practiced otherwise than as specically described.

I claim:

1. A distributing system for articles to be selectively delivered to a plurality of stations located at opposite sides of a track, comprising a carrier movable along said track, a load support on said carrier provided with a generally horizontal load-bearing surface, first and second pivot means on said carrier releasably engaging said support, said support being held by said pivot means for respective rotation about two generally horizontal, substantially parallel axes spaced apart in a direction transverse to the direction of carrier motion, and mechanism at each of said stations operable to impart to said support a tilting displacement about one of said pivot means while simultaneously releasing said support from the other of said pivot means.

2. A system according to claim 1 wherein said first and second pivot means comprise at least two upwardly open bearing elements positioned on said carrier on opposite sides of its longitudinal median plane, said support being provided with two transversely spaced pivot shafts respectively received in said bearing elements.

3. A system according to claim 1 wherein said support is provided with dependent cam means, said mechanism including lift means selectively positionable in the path of said cam means for camming engagement therewith in a sense tending to lift said support out of engagement with one of said pivot means.

4. A system according to claim 3 wherein said cam means is positioned centrally of said support, said mechanism further comprising guard means positioned at each station adjacent either of said pivot means for preventing the disengagement thereof from said support.

5. A system according to claim 4 wherein said guard means comprises a stationary rail and roller means on said support overlain by said rail.

6. A system according to claim 3 wherein said cam means comprises a pair of cam elements positioned on opposite sides of the longitudinal median plane of said carrier, said lift means comprising a pair of independently movable lifting elements respectively engageable with said cam elements.

7. A system according to claim 3 wherein said cam means comprises a swingable bail.

8. A system according to claim 3 wherein said lift means comprises a roller engageable with said bail, said mechanism further comprising actuating means for axially displacing said roller into the path of said bail, spring means tending to maintain said roller out of alignment with said bail, locking means for holding said roller aligned upon its displacement by said actuating means, and release means on said carrier for inactivating said locking means upon a movement of said carrier past the station at which said actuating means was operative.

9. A system according to claim 8 wherein said actuating means comprises an electromagnet.

10. A system according to claim 8 wherein said roller is provided with an axially shiftable shaft, said locking means comprising an arm in contact with said shaft and biasing means urging said arm into locking engagement with said shaft in a predetermined axial position of the latter.

11. A system according to claim 10 wherein said release means comprises a trip member on said support engageable with an extension of said arm.

12. A system according to claim 1, further comprising detent means on said carrier extending upwardly beyond said load-bearing surface in the normal position of said support, said detent means when thus extending being adapted to prevent the sliding of a load off said surface, said support upon tilting about either of said pivot means raising said surface above the top of said detent means, thereby disengaging said detent means from said load.

13. A system according to claim 12 wherein said load-bearing surface is provided with at least two slots on opposite sides of its longitudinal median plane, said detent means comprising at least two arms extending upwardly through said slots.

14. In a distributing system, in combination, a carrier, drive means for moving said carrier along a track, a load support swingably mounted on said carrier, mechanism selectively actuable at a predetermined location along said track for swinging said support into a load-discharging position, and detent means on said carrier extending upwardly beyond said support for preventing the premature discharge of a load therefrom, said support upon being tilted by said mechanism rising above the top of said detent means, thereby disengaging said detent means from said load.

15. In a distributing system, in combination, a carrier, drive means for moving said carrier along a track, a load support swingably mounted on said carrier, a camming element depending from said support, lift means positioned at a predetermined location along said tarck for displacement into operative alignment with said camming element, and mechanism for so displacing said lift means in response to a predetermined signal; said mechanism including spring means tending to maintain said lift means out of an aligned position with said camming element, actuating means operable to displace said lift means into said aligned position against the force of said spring means, locking means bearing upon said lift means, and biasing means urging said locking means into return-blocking engagement with said lift means upon arrival of said lift means in said aligned position.

References Cited in the file of this patent
UNITED STATES PATENTS

| | | |
|---|---|---|
| 2,344,596 | Carmina | Mar. 21, 1944 |
| 2,667,260 | Pyles | Jan. 26, 1954 |